Figure 1:
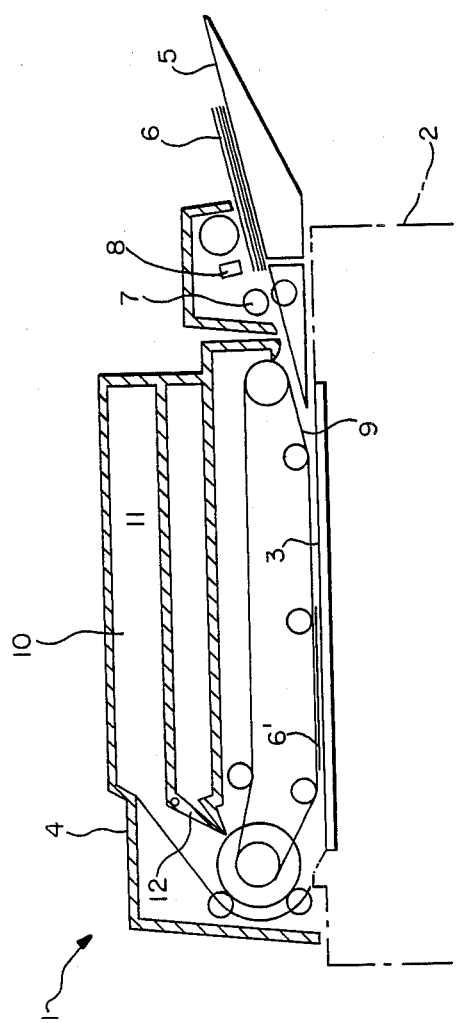

United States Patent [19]

Kurosaki

[11] Patent Number: 4,851,885
[45] Date of Patent: Jul. 25, 1989

[54] AUTOMATIC DOCUMENT FEEDER FOR ELECTROPHOTOGRAPHIC COPYING MACHINE

[75] Inventor: Hiroshi Kurosaki, Yamatokoriyama, Japan

[73] Assignee: Sharp Kabushiki Kaisha, Osaka, Japan

[21] Appl. No.: 147,436

[22] Filed: Jan. 25, 1988

Related U.S. Application Data

[63] Continuation of Ser. No. 45,193, Apr. 30, 1987, abandoned, which is a continuation of Ser. No. 868,783, May 29, 1986, abandoned.

[30] Foreign Application Priority Data

Jun. 10, 1985 [JP] Japan ................................ 60-125841

[51] Int. Cl.$^4$ .......................................... G03G 15/00
[52] U.S. Cl. .................................. 355/308; 355/321; 355/322; 355/132; 271/3.1; 271/10
[58] Field of Search ....................... 355/14 SH, 3 SH; 271/303–305, 3.1, 18, 10

[56] References Cited

U.S. PATENT DOCUMENTS 4,264,187  4/1981  Rhodes, Jr. .................... 355/14 SH
4,534,643  8/1985  Watanabe ............................ 271/186

Primary Examiner—A. C. Prescott
Attorney, Agent, or Firm—Flehr, Hohbach, Test, Albritton & Herbert

[57] ABSTRACT

A control mechanism of an automatic document feeder for an electrophotographic copying machine is provided with a plurality of document discharge trays and a selecting device to select one of the document discharge trays to receive a document which has been processed and discharged. The control mechanism generally selects a specified one of the document discharge trays when documents are set on a supply tray and transported sequentially by the feeder. Only while the first of these documents is being transported from the supply tray into a processing position, however, the control mechanism selects a tray other than the specified one such that a document which may have been left inadvertently in the feeder by the previous user does not become mixed with the documents which are discharged subsequently.

5 Claims, 2 Drawing Sheets

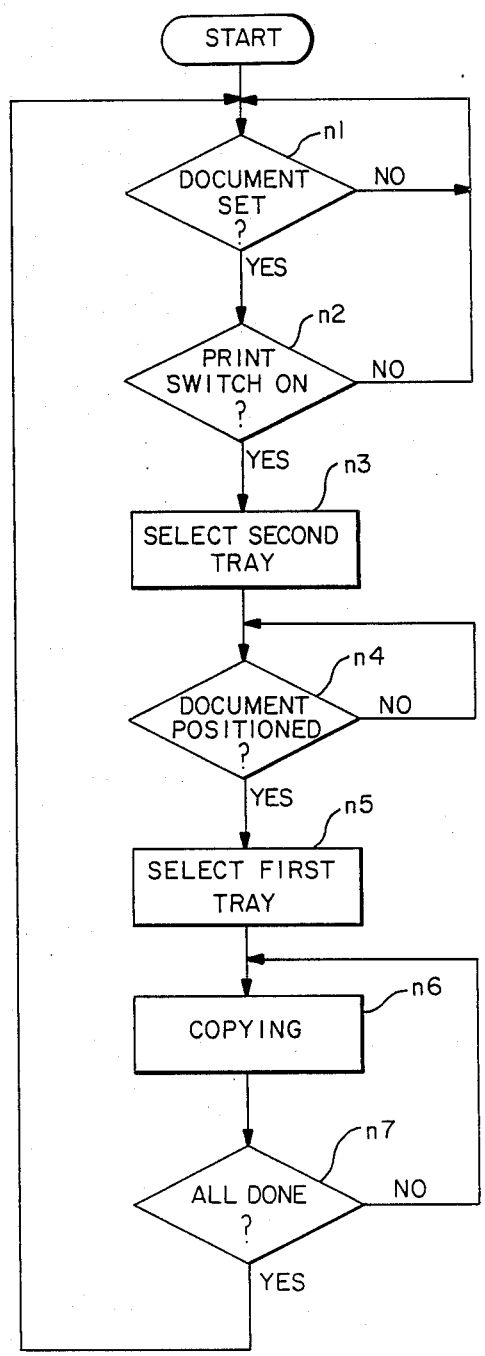
FIG. −2

AUTOMATIC DOCUMENT FEEDER FOR ELECTROPHOTOGRAPHIC COPYING MACHINE

This is a continuation, of application Ser. No. 045,193 filed Apr. 30, 1987, now abandoned.

This invention relates to a control mechanism of an automatic document feeder for an electrophotographic copying machine or the like and more particularly to such control mechanism of an automatic feeder which serves to automatically transport a plurality of documents sequentially for processing.

Recently, an increased number of copying machines for processing large amounts of documents are equipped with an automatic document feeder. When such a machine equipped with an automatic document feeder is used to make copies of only one document, the user frequently chooses not to use the feeder but to open the document cover and place the document directly on top of the document table. When a copying machine is operated manually like this, however, it frequently happens that the user forgets to retrieve the document, leaving it on the document table after the processing is over. If the automatic document feeder is used subsequently with a new set of documents, the document left on the document table and the new documents become mixed together on the discharge tray. In many situations, this can easily cause a loss of precious documents. This problem, however, cannot be eliminated simply by providing a plurality of discharge trays to an automatic document feeder of a conventional type. Moreover, a problem of this nature is encountered equally commonly with machines other than electrophotographic copiers.

In view of the above, it is an object of the present invention to provide a control mechanism of an automatic document feeder which will prevent a document left inadvertently therein from becoming mixed with new documents which are subsequently introduced therein.

The above and other objects of the present invention are achieved by providing a plurality of discharge trays to an automatic document feeder and also a tray selecting mechanism for determining, when a processed document is discharged, which of these trays should receive this discharged document. The automatic document feeder is further provided with a control means for controlling the operation of this tray selecting mechanism such that any discharge of document which may be effected while the first of a plurality of supplied documents is transported to the processing position of the copying machine is to one of the discharge trays other than a specified one but that the discharge is made to this specified discharge tray after the aforementioned first document has been transported to the processing position. In other words, when a plurality of documents to be copied are set in a supply tray for an automatic mode of operation, the feeder of the present invention will firstly transport the first document in the supply tray as far as the processing position where the document is temporarily stopped for processing. If there is in this situation a previously processed document left at the processing position, this left-over document is transported out of the processing position simultaneously as the first of the new set of documents is transported into the processing position. When the processing of this first document is completed, the second document in the supply tray is brought to the processing position simultaneously as the first document is discharged into one of the discharge trays selected by the tray selecting mechanism. This operation is subsequently repeated until all documents of the newly supplied set are processed and discharged into the aforementioned specified discharge tray. Since the left-over document from the previous operation is discharged into a tray different from the aforementioned specified discharge tray, the problem of mix-up can be obviated.

The accompanying drawings, which are incorporated in and form a part of the specification, illustrate an embodiment of the present invention and, together with the description, serve to explain the principles of the invention. In the drawings:

FIG. 1 is a cross-sectional view which schematically shows the structure of an automatic document feeder embodying the present invention, and FIG. 2 is a flow-chart for the operation of a control mechanism of the automatic document feeder of FIG. 1.

Reference being made to FIG. 1, an automatic document feeder 1 embodying the present invention comprises a document table 3 (or the processing position thereon) of a copying machine 2, a document cover 4 disposed above the document table 3, and a document supply tray 5 connected to one end of the document cover 4. The document supply tray 5 is for placing a pile of documents 6 thereupon and these documents 6 are transported one by one through the operation of feeder rollers 7 to the document table 3. Numeral 8 indicates a detector switch for detecting the existence of documents on the document supply tray 5. Inside the document cover 4 are a document transporting device 9, a first document discharge tray 10 and a second document discharge tray 11. The document transporting device 9 comprises a conveyer belt which serves to transport a document 6 supplied from the document supply tray 5 to the document table 3 and to discharge it after turning it over either into the first document discharge tray 10 or into the second document discharge tray 11. The first document discharge tray 10 and the second document discharge tray 11 form a double-layered structure one on top of the other above the document transporting device 9. Near the document-receiving end of this double-layered structure is a branching plate 12 (or a tray selecting mechanism) which serves to select whether a document 6 transported by the document transporting device 9 should be discharged into the first document discharge tray 10 or into the second document discharge tray 11.

The operation of a control mechanism for the automatic document feeder 1 described above is explained next by way of the flowchart of FIG. 2. For convenience, this flowchart shows only the automatic mode of operation of the automatic document feeder 1, its manual mode of operation being omitted in FIG. 2.

After the control mechanism is switched on (START), it waits until the detector switch 8 detects the existence of a document or documents 6 on the document supply tray 5 (n1). When documents 6 are set in the document supply tray 5 and the detector switch 8 detects their existence (YES to n1), the control mechanism waits until the PRINT switch (not shown) on the operation panel (not shown) of the copier is pressed (n2). When the PRINT switch is pressed, the branching plate 12, which has been pointing down to select the first document discharge tray 10, is moved upward such that the second document discharge tray 11 is selected (n3). It is assumed in this connection that the documents 6 set on the document supply tray 5 are arranged either by operation or by initialization to become discharged into the first document discharge tray 10. It also goes without saying that the aforementioned step n3 is unnecessary if the branching plate 12 was initially in the upward-pointing position. Next, the first of the documents 6 set on the document supply tray 5 is transported by the document transporting device 9 and the control mechanism waits until this document reaches a designated position on the document table 3 (n4). If there is a left-over document 6' from a previous operation remaining on the document table 3, it is transported simultaneously by the document transporting device 9 and discharged into the second document discharge tray 11, directed by the branching plate 12 which, as explained above, is then assuming the upward-pointing position. When the first document 6 stops at the aforementioned designated position on the document table 3 (YES to n4), the branching plate 12 is operated again such that it will assume the downward-pointing position and select the first document discharge tray 10 (n5). The steps n3 through n5 represent the operation of what is herein referenced to as the control mechanism of the automatic document feeder 1. If there is no left-over document 6' from a previous operation remaining on the document table 3, the aforementioned control does not perform any useful function.

When the operation of the control mechanism is completed, a series of copying operations is performed with respect to the first document 6 now on the document table 3. After these copying operations, the first document 6 is transported away from the document table 3 into the first document discharge tray 10 selected by the branching plate 12 (n6) while, at the same time, the detector switch 8 determines whether there is still another document 6 to be processed on the document supply table 5 (n7) and, if there is a second document (NO to n7), the document transporting device 9 transports the second of the documents 6 from the document supply tray 5 to the designated position on the document table 3. The control mechanism then returns to step n6 and a copy or copies of the second document are made as before. The second document is thereafter discharged also into the first document discharge tray 10 and the detector switch 8 determines whether there is a third document to be brought in. This cycle of events is repeated until all documents 6 on the document supply tray 5 have been processed in identical manners and discharged into the first document discharge tray 10. When the last of the documents 6 originally on the document supply tray 5 is discharged into the first document discharge tray 10, the detector switch 8 determines that the document supply tray 5 is empty (YES to n7) and the control mechanism returns to step n1 and waits until the next user prepares for another operation.

In summary, the automatic document feeder 1 according to the present invention comprises two document discharge trays 10 and 11, one of which (10 in the explanation given above) is adapted to receive discharged documents in normal operations while the other is adapted to receive the document which may have been inadvertently left inside the feeder from the previous operation. Since the documents from the current operation are thus discharged separately into a different tray from the left-over document, they do not mix together and the loss of documents can be prevented. Moreover, the control steps n3 through n5 are carried out independently of whether there is a left-over document 6' inside the feeder 1 or not, and this obviates the need for a detector means for indicating the existence of a left over document 6' on the document table 3.

The foregoing description of a preferred embodiment of the invention has been presented for purposes of illustration and description. It is not intended to be exhaustive or to limit the invention to the precise form disclosed, and obviously many modifications and variations are possible in light of the above teaching. Such modifications and variations which may be apparent to a person skilled in the art are intended to be included within the scope of the present invention.

What is claimed is:

1. An automatic document feeder comprising
a plurality of discharge trays for receiving discharged documents,
a selection means for selecting one of said discharge trays,
a supply tray for placing documents thereon, and
a transporting means for transporting documents one sheet at a time from said supply tray to a processing position and from said processing position to one of said discharge trays selected by said selection means, and
a control mechanism controlling said selection means so as to normally select a specified one of said discharge trays when said automatic document feeder is operated except another one of said discharge trays different from said specified one of said discharge trays is selected when the first one of a plurality of documents on said supply tray to be continuously transported therefrom is transported by said transporting means from said processing position.

2. The automatic document feeder of claim 1 further comprising two discharge trays.

3. The automatic document feeder of claim 1 which is a part of an electrophotographic copying machine.

4. The automatic document feeder of claim 2 wherein said selection means comprises a displaceable plate attached to one of said discharge trays, said plate serving to assume selectively one of two positions, defining a passage respectively to one of said two discharge trays.

5. The automatic document feeder of claim 2 wherein said selection means comprises a rotatably supported plate around an axis.

* * * * *